United States Patent [19]

Nomura et al.

[11] 4,419,563

[45] Dec. 6, 1983

[54] ROTARY ARC-WELDING METHOD

[75] Inventors: Hirokazu Nomura; Yuji Sugitani, both of Tsu, Japan

[73] Assignee: Nippon Kokan Kabushiki Kaisha, Tokyo, Japan

[21] Appl. No.: 326,511

[22] Filed: Dec. 2, 1981

[51] Int. Cl.³ .............................................. B23K 9/28
[52] U.S. Cl. ........................... 219/137 R; 219/125.12
[58] Field of Search ........... 219/137 R, 137.2, 125.12, 219/125.11

[56] References Cited

U.S. PATENT DOCUMENTS 4,047,656 9/1977 McCombs ...................... 219/125.12
4,175,227 11/1979 Kasper ........................... 219/125.12

FOREIGN PATENT DOCUMENTS 53-9571 4/1978 Japan .
55-133871 10/1980 Japan .

Primary Examiner—B. A. Reynolds
Assistant Examiner—Catherine Sigda
Attorney, Agent, or Firm—Frishauf, Holtz, Goodman & Woodward

[57] ABSTRACT

In a rotary arc-welding method which comprises: directing a nozzle substantially vertically toward a weld zone of objects of welding; feeding a consumable welding electrode through said nozzle eccentrically from the center axis of said nozzle toward said weld zone; feeding welding current to said consumable welding electrode to produce an arc between the tip of said consumable welding electrode and said weld zone to weld said objects of welding with each other by means of the arc heat; rotating said nozzle to cause a circular movement of said arc from the tip of said consumable welding electrode corresponding to the eccentricity thereof; and, feeding a shielding gas toward said weld zone to shield said arc and said weld zone from the open air; the improvement characterized in that: the diameter of said consumable welding electrode is limited within the range of from 0.8 to 1.2 mm; said welding current is limited within the range of from 400 to 800 amperes; and, the number of rotation of said nozzle is limited within the range of from 3,000 to 6,000 r.p.m.

1 Claim, 2 Drawing Figures

ROTARY ARC-WELDING METHOD

REFERENCE TO PATENTS, APPLICATIONS AND PUBLICATIONS PERTINENT TO THE INVENTION (1) Japanese Patent Publication No. 9,571/78 dated Apr. 6, 1978; and,
(2) Japanese Patent Provisional Publication No. 133,871/80 dated Oct. 18, 1980.

FIELD OF THE INVENTION

The present invention relates to a rotary arc-welding method for carrying out a welding by causing an arc produced from the tip of a consumable welding electrode fed through a nozzle to a weld zone to follow a circular movement by the rotation of said nozzle.

BACKGROUND OF THE INVENTION

Welding of at least one object to be welded (hereinafter objects of welding) such as thick steel plates requires a high efficiency of welding operations. The submerged arc-welding method is widely adopted because of its high welding efficiency as compared with those of the other welding methods, which is brought about by its large heat input to the objects of welding.

However, the submerged arc-welding method is problematic in that, because of its large heat input to the objects of welding, quality degradation, i.e., the decrease in toughness is caused in the welding heat affected zone around the weld zone. The decrease in toughness occurring in the welding heat affected zone is particularly serious in steel products in service at low temperatures such as in cold districts and LPG storage tanks. Therefore, the submerged arc-welding method is not desirable for welding of steel products used in particular at low temperatures, in spite of the advantage of allowing welding of the objects of welding at a high efficiency.

With this problem in view, a high-speed and large current gas-shielded arc-welding method of steel with the use of a mixed gas of inert gases and active gases as a shielding gas is disclosed in Japanese Patent Publication No. 9,571/78 dated Apr. 6, 1978 (Japanese Patent Application No. 135,559/74), which comprises the steps of: using at least one low-alloy steel solid wire consumable electrode having a diameter of substantially from 3.0 to 6.4 mm; feeding a welding current of from 600 to 1,500 amperes; supplying a shielding gas at a rate of from 50 to 200 l/minute per consumable electrode to shield the resulting arc; and, carrying out welding at a speed of from 300 to 1,500 mm/minute with an arc voltage of from 23 to 36 volts (hereinafter referred to as the "prior art 1").

According to the welding method of the prior art 1, it is possible to weld the objects of welding at a high speed with a large current, with a small heat input into the weld zone, and thus to weld even steel products to be used at low temperatures at a high efficiency without causing quality degradation at the welding heat affected zone.

However, the welding method of the above-mentioned prior art 1 is problematic in that penetration of a molten metal into the weld zone is partially very deep and a welding defect is caused at the portion of this deep penetration. FIG. 1 is a schematic sectional view illustrating a welding machine employed in the welding method of the above-mentioned prior part 1 and an example of weld zone. In FIG. 1, 1 is a nozzle. 2 is a consumable welding electrode fed through the nozzle 1 in the axial direction thereof and from the lowermost end of the nozzle 1 toward objects of welding 3. 4 is a feeding port of a shielding gas, which is provided at the upper portion of the nozzle 1. 5 is an ejecting port of shielding gas opening at the lowermost end of the nozzle 1. A welding power source (not shown) is connected between the objects of welding 3 and the consumable welding electrode 2, thus producing an arc 6 between the tip of the consumable welding electrode 2 and the objects of welding 3. Also in FIG. 1, 7 is a molten metal produced on the objects of welding 3 by the heat of the arc 6. In case of the welding method of the above-mentioned prior art 1, penetration of the molten metal 7 tends to be deep because of the high current density and the strong concentration of the arc. Such a deep penetration of the molten metal 7 causes occurrence of cracks in the objects of welding 3. These cracks tend to easily occur particularly when welding an I-shaped narrow groove having a narrow groove width, of which the groove faces face parallelly each other.

As a method for efficiently welding the objects of welding having the above I-shaped narrow groove without causing a defective fusion of corners, an arc-welding method of a narrow groove is disclosed in Japanese Patent Provisional Publication No. 133,871/80 dated Oct. 18, 1980 (Japanese Patent Application No. 42,014/79), which comprises: feeding a consumable welding electrode through a rotatable nozzle, which is provided so that the center axis of said nozzle is located at the center of an I-shaped narrow groove having groove faces formed in the objects of welding facing parallelly each other, eccentrically from the center axis of said nozzle toward the weld zone of the objects of welding; producing an arc between the tip of said consumable welding electrode and said weld zone to weld the weld zone by the heat of the arc; rotating said nozzle to cause a circular movement of said arc corresponding to the eccentricity of said arc from the tip of said consumable welding electrode; and, feeding a shielding gas toward said weld zone to shield said arc and said weld zone from the open air (hereinafter referred to as the "prior art 2").

However, the above-mentioned prior art 2 discloses only a method for stably welding a narrow groove by solving the insufficient penetration at the both corners of the narrow groove, the conditions of which include a welding current of 300 amperes and a number of rotation of the nozzle of about 1,200 r.p.m., and which does not satisfy the requirements of a high-efficiency gas-shielded arc-welding free of welding defects.

SUMMARY OF THE INVENTION

An object of the present invention is therefore to provide a rotary arc-welding method which permits welding at a high efficiency, without causing quality degradation at the welding heat affected zone of the at least one object to be welded (objects of welding,) and achievement of uniform penetration of a molten metal, without causing welding defects.

In accordance with one of the features of the present invention, there is provided, in a rotary arc-welding method which comprises: directing a nozzle substantially vertically toward a weld zone of objects of welding; feeding a consumable welding electrode through said nozzle eccentrically from the center axis of said nozzle toward said weld zone; feeding welding current to said consumably welding electrode to produce an arc between the tip of said consumable welding electrode and said weld zone to weld said objects of welding with each other by means of the arc heat; rotating said nozzle to cause a circular movement of said arc from the tip of said consumable welding electrode corresponding to the eccentricity thereof; and, feeding a shielding gas toward said weld zone to shield said arc and said weld zone from the open air; the improvement characterized in that: the diameter of said consumable welding electrode is limited within the range of from 0.8 to 1.2 mm; said welding current is limited within the range of from 400 to 800 amperes; and, the number of rotation of said nozzle is limited within the range of from 3,000 to 6,000 rotations per minute (r.p.m.).

DETAILED DESCRIPTION OF THE PREFERRED EMBODIMENTS

Figure 1:
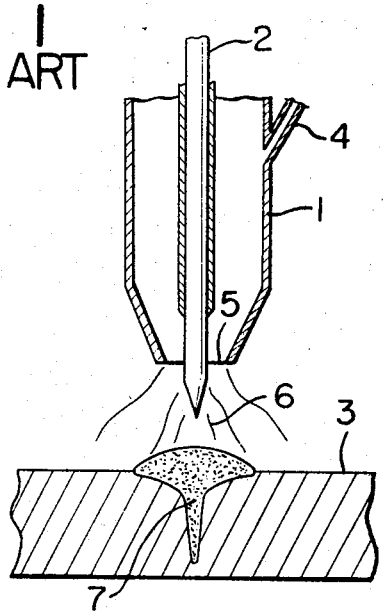
FIG. 1 is a schematic sectional view illustrating a welding machine employed in the conventional gas shielded arc-welding method and an example of weld zone; and, FIG. 2 is a schematic perspective view illustrating a welding machine employed in the rotary arc-welding method of the present invention and an example of weld zone.

With a view to solving many problems as mentioned above involved in arc-welding of the objects of welding, we carried out extensive studies.

As a result, we found that, by feeding a large welding current to a small-diameter consumable welding electrode, and welding the objects of welding while causing a circular movement of the consumable welding electrode at a high speed, it is possible to carry out welding at a high efficiency without producing a deep penetration at the weld zone of the objects of welding and without causing quality degradation at the welding heat affected zone around the weld zone.

The present invention was made on the basis of the above-mentioned finding, and provide, in a rotary arc-welding method which comprises:

directing a nozzle substantially vertically toward a weld zone of objects of welding; feeding a consumable welding electrode through said nozzle eccentrically from the center axis of said nozzle toward said weld zone; feeding welding current to said consumable welding electrode to produce an arc between the tip of said consumable welding electrode and said weld zone and to weld said objects of welding with each other by means of the arc heat; rotating said nozzle to cause a circular movement of said arc from the tip of said consumable welding electrode corresponding to the eccentricity thereof; and, feeding a shielding gas toward said weld zone to shield said arc and said weld zone from the open air;

the improvement characterized in that:

the diameter of said consumable welding electrode is limited within the range of from 0.8 to 1.2 mm;

said welding current is limited within the range of from 400 to 800 amperes; and, the number of rotation of said nozzle is limited within the range of from 3,000 to 6,000 r.p.m.

The reasons why the welding conditions of the objects of welding are limited as mentioned above in the present invention are described below.

1. Consumable welding electrode

The diameter of the consumable welding electrode is limited within the range of from 0.8 to 1.2 mm for the following reason. A diameter of the consumable welding electrode of under 0.8 mm is too small to allow a large welding current mentioned later to be fed therethrough, and, therefore, causes a low efficiency of welding operations. With a diameter of the consumable welding electrode of over 1.2 mm, on the other hand, the resulting arc would have a very large width because of the high-speed circular movement of the consumable welding electrode as described later, resulting in a spread penetration in the weld zone, i.e., a poor welding.

2. Welding current

The welding current is limited within the range of from 400 to 800 amperes for the following reason. Because of the high-speed circular movement of the consumable welding electrode as described later, the heat input of the arc produced between the consumable welding electrode and the weld zone is dispersed. As a result, a welding current of under 400 amperes leads to an insufficient penetration into the weld zone. With a welding current of over 800 amperes, on the other hand, the consumable welding electrode is excessively heated, resulting in an excessively early fusion of the consumable welding electrode, thus making it impossible to obtain a stable arc.

3. Nozzle rotation

The number of rotations of the nozzle is limited within the range of from 3,000 to 6,000 r.p.m. for the following reason. If the number of rotation of the nozzle is under 3,000 r.p.m., the speed of circular movement of the arc is low, resulting in the deflection of the formed bead and a uniform bead shape cannot be obtained. A number of rotations of the nozzle of over 6,000 r.p.m. does not bring about an additional effect on the formation of a uniform bead, and the consumption of necessary energy for excessively high rotation is uneconomical.

Figure 2:
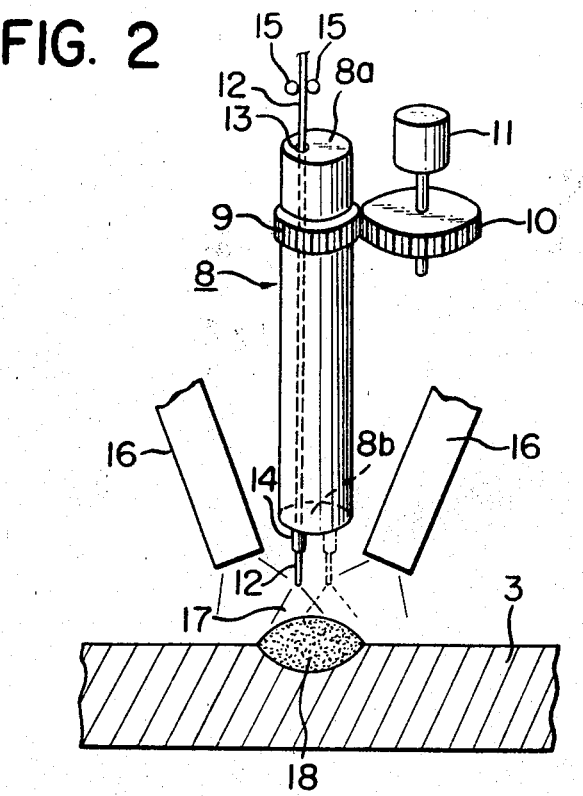

Now, the method of the present invention is described with reference to the drawings. FIG. 2 is a schematic perspective view illustrating a welding machine employed in the method of the present invention, particularly the nozzle and the consumable welding electrode sections, and an example of a weld zone. In FIG. 2, 8 is a nozzle directed substantially vertically toward the weld zone of objects of welding 3. The nozzle 8 is vertically movably held by a holder (not shown). Driven gear 9 is fixed to the upper periphery of the nozzle 8. Driving gear 10 engages the driven gear 9 for rotatably driving the latter. The driving gear 10 is rotatably driven by a motor 11 supported by a suitable support (not shown), and in turn rotatably drives the nozzle 8 through a connection of the gears 10 and 9.

Also in FIG. 2, 12 is a consumable welding electrode having a diameter within the range of from 0.8 to 1.2 mm. The consumable welding electrode 12 is fed by rollers 15,15 at a constant speed into the nozzle 8 from a feeding port 13 provided at a location eccentric from the center axis of the nozzle 8 on the upper face 8a of the nozzle 8, and then continuously fed toward the weld zone from a tip 14 which is provided at a location eccentric from the center axis of the nozzle 8 on the bottom face 8b of the nozzle 8 as is in case of the feeding port 13 on the upper face 8a of the nozzle 8. In the same figure, ejecting nozzles 16,16 eject a shielding gas for shielding an arc 17 produced between the tip of the consumable welding electrode 12 and the weld zone, and the weld zone from the open air.

By connecting a welding power source (not shown) between the objects of welding 3 and the consumable welding electrode 12 to supply welding current to the consumable welding electrode 12, the arc 17 is produced between the tip of the consumable welding electrode 12 and the objects of welding 3. Since the consumable welding electrode 12 is fed eccentrically from the center axis of the nozzle 8, the arc 17 from the tip of the consumable welding electrode 12 makes a circular movement corresponding to this eccentricity by the rotation of the nozzle 8. Thus, by rotating the nozzle 8 at a number of rotations within the range of from 3,000 to 6,000 r.p.m., a high-speed circular movement of the arc 17 is caused, and the weld zone becomes a molten metal 18 which penetrates into the objects of welding by the heat of the arc 17 and is thus welded. During this process, a shielding gas is fed through the ejecting nozzles 16,16 to the weld zone to shield the arc 17 and the molten metal 18 from the open air.

It is also possible to feed the consumable welding electrode 12 to the objects of welding 3 through the center of the upper face 8a of the nozzle 8, center axis of the nozzle 8, and the tip 14 provided at the location eccentric from the center axis of the nozzle 8 on the bottom face 8b of the nozzle 8.

The arc 17 which makes a circular movement by the rotation of the nozzle 8 as mentioned above looks as if it were produced by a large-diameter consumable welding electrode having a diameter equal to the diameter of the circle of this circular movement. However, since the arc 17 actually makes a circular movement with a radius eccentric from the center axis of the nozzle 8, the molten metal 18 uniformly penetrates into the objects of welding 3. It is therefore possible to carry out an excellent welding free from welding defects without causing a deep penetration as in the conventional welding.

Now, the method of the present invention is described more in detail by means of an example.

EXAMPLE

Steel plates having a thickness of 100 mm were welded by the rotary arc-welding method of the present invention at an I-shaped groove with groove faces parallelly facing each other with a groove gap of 12 mm under the following conditions:

(1) Diameter of the consumable welding electrode: 1.2 mm;
(2) Material of the consumable welding electrode: Si-Mn alloy steel;
(3) Number of rotation of the nozzle: 4,200 r.p.m.;
(4) Welding current: DC current of 600 amperes;
(5) Welding voltage: 40 volts;
(6) Welding speed: 600 mm per minute;
(7) Chemical composition of shielding gas: argon gas mixed with 20 vol.% $CO_2$ gas.

As a result of welding under the above-mentioned conditions, a molten metal uniformly penetrated into the groove, and an excellent welding free from welding defects could be effected at a high welding speed at a high efficiency without producing a partially deep penetration.

The above-mentioned example has covered a case in which the objects of welding are welded with each other. However, the present invention is applicable also to the case in which a build-up welding is applied onto the surface of the object of welding.

According to the method of the present invention as described above in detail, in welding the objects of welding such as steel plates, defects in material quality are not produced in the welding heat affected zone around the weld zone, a molten metal penetrates uniformly into the weld zone, cracks caused by a partially deep penetration do not occur, and a high-efficiency welding can be conducted, thus providing industrially useful effects.

What is claimed is:

1. In a rotary arc-welding method which comprises: directing a nozzle substantially vertically toward a weld zone of at least one object of welding; feeding a consumable welding electrode through said nozzle eccentrically from the center axis of said nozzle toward said weld zone; feeding welding current to said consumable welding electrode to produce an arc between the tip of said consumable welding electrode and said weld zone to weld said at least one object of welding by means of heat from said arc; rotating said nozzle to cause a circular movement of said arc from the tip of said consumable welding electrode corresponding to the eccentricity thereof; and, feeding a shielding gas toward said weld zone to shield said arc and said weld zone from the open air;

the improvement wherein:
the diameter of said consumable welding electrode is limited within the range of from 0.8 to 1.2 mm;
said welding current is limited within the range of from 400 to 800 amperes; and,
the number of rotations of said nozzle is limited within the range of from 3,000 to 6,000 r.p.m.

* * * * *